(12) United States Patent
Kim (10) Patent No.: US 7,079,535 B2
(45) Date of Patent: Jul. 18, 2006

(54) METHOD AND APPARATUS FOR REAL-TIME FAULT-TOLERANT MULTICASTS IN COMPUTER NETWORKS

(75) Inventor: Kwang H. Kim, Irvine, CA (US)

(73) Assignee: The Regents of the Universtiy of California, Oakland, CA (US)

( * ) Notice: Subject to any disclaimer, the term of this patent is extended or adjusted under 35 U.S.C. 154(b) by 769 days.

(21) Appl. No.: 09/917,575

(22) Filed: Jul. 27, 2001

(65) Prior Publication Data

US 2002/0018484 A1    Feb. 14, 2002

Related U.S. Application Data

(60) Provisional application No. 60/221,829, filed on Jul. 28, 2000.

(51) Int. Cl.
*H04L 12/56* (2006.01)
(52) U.S. Cl. ........................ 370/390; 370/242
(58) Field of Classification Search ............... 370/241, 370/242, 244, 245, 250, 389, 390, 432, 216
See application file for complete search history.

(56) References Cited

U.S. PATENT DOCUMENTS 6,223,286 B1 *   4/2001   Hashimoto .................. 713/178

* cited by examiner

*Primary Examiner*—Derrick Ferris
(74) *Attorney, Agent, or Firm*—Daniel L. Dawes; Myers Dawes Andras & Sherman LLP (57) ABSTRACT

The sender of a multicast in a computer network attaches an official release time to the message being multicast, asking every receiver to process the message at or after the official release time. A receiver may receive a cancellation notice after receiving the multicast message but before its official release time. The official release time is chosen so that the multicast can succeed or be cancelled by the official release time with the probability at or above a user selected level under reasonably bounded numbers of occurrences of permanent and temporary faults and reasonably bounded durations of temporary faults. This multicast protocol is formulated to suit the environment where it is not worth it for a node to wait for a reply from another node beyond a certain time-period, called the timeout period.

17 Claims, 2 Drawing Sheets

METHOD AND APPARATUS FOR REAL-TIME FAULT-TOLERANT MULTICASTS IN COMPUTER NETWORKS

RELATED APPLICATIONS

The present application is related to U.S. Provisional Patent Application, Ser. No. 60/221,829, filed Jul. 28, 2000.

This invention as made with Government support under Grant No. 9975053, awarded by the National Science Foundation, and Grant No. N66001-97-C-8516, awarded by the Department of Defense (Navy—DARTPA). The Government has certain rights in this invention.

BACKGROUND OF THE INVENTION

1. Field of the Invention

The invention is related to the field of group communication in real-time computing systems.

2. Description of the Prior Art

Components of application systems based on a network of computing nodes (e.g. PCs and workstations) often maintain the client-server relationship among themselves. For the sake of attaining high system reliability and performance, servers are often replicated. These server replicas must then maintain strict consistency among their states. Each message from a client must be received consistently by these server replicas. Also, clients and diverse servers are often tightly coupled in the sense that they interact closely and every party should read in the same order the messages from multiple sources even if not every party reads the identical set of messages. This consistent multicast communication becomes a complicated problem when the possibilities of failures of computer and communication components are not negligible.

Existing solutions are not sufficient because they guarantee neither timely reception and consistent processing of the multicast messages by the receivers nor consistent understanding of the success or failure of a multicast among all nodes involved, i.e., the sender and the receivers under some plausible and non-negligible occurrences of component failures.

Group communication in real-time computing systems has been a subject of research for almost two decades but it is not yet a mature technological field. The main challenge in establishing group communication protocols is to deal with possible fault occurrences. There have been some proposals for using group communication protocols, in particular, reliable multicast mechanisms, as basic building-blocks for fault-tolerant distributed systems. The validity of this thesis cannot be established until practical reliable multicast mechanisms are established.

What is needed is some type of method and system to ensure that the sender and all receivers reach without excessive delay the same correct conclusion that all the receivers correctly received the message.

Further what is needed is some type of method and system to ensure that the sender and all healthy receivers reach without excessive delay the same correct conclusion that at least one receiver failed to receive the message and thus that the multicast was cancelled.

Still further what is needed is some type of method and system to ensure that all healthy receivers reach without excessive delay the same correct conclusion that the sender became permanently disabled before confirming the successful receiving of the message by every receiver and thus that the multicast was cancelled.

BRIEF SUMMARY OF THE INVENTION

The technique disclosed here is based on the incorporation of the notion of the official release time (ORT). Under this technique the sender attaches the official release time to the message being multicast, thereby asking every receiver to process the message at or after the official release time. A receiver may sometimes receive a cancellation notice after receiving the multicast message but before its official release time. The official release time is chosen such that the probability of the multicast being completed by that time with a conclusion of success or failure subject to reasonably bounded limits of component failures, is at or above a user selected level. This multicast protocol is formulated to suit the environment where it is not worth it for a node to wait for a reply from another node beyond a certain time-period called the timeout period, and it is better for the node to assume at any time after the timeout period that the particular inquiry-reply communication between the two nodes has failed. So, it is a protocol for real-time fault-tolerant multicasts.

When some receivers receive multiple multicast messages at around the same time, there is no inconsistency among the receivers under this technique due to the use of official release times. The types and rates of component failures that can be tolerated under this are quite broad.

The invention may be defined as an improvement in a method for communication in a computer network to a plurality of receivers in a multicast session comprising the steps of transmitting a multicast message to the plurality of receivers from a sender through the computer network. The transmitted multicast message is processed in every receiver at or after a certain time defined as the official release time, which is chosen and sent to every receiver by the sender such that when both the sender and plurality of receivers remain healthy during the multicast session, the probability of the multicast being completed before the official release time is at or above a user selected level.

The invention also includes an improvement in a method for communication in a computer network to a plurality of receivers comprising the steps of transmitting a multicast message from a sender to the plurality of receivers through the computer network, and processing the received multicast message in the plurality of receivers only after a time defined as the official release time, which is chosen and sent to every receiver by the sender such that the multicast is cancelled, when the message cannot be delivered to a receiver after the sender makes a pre-determined number of attempts or when the sender becomes disabled before it can confirm the success of the multicast. A cancellation notice is generated preferably by the sender but it is possible to let any member in the multicast group issue such a notice. A cancellation step is performed by all intended healthy receivers and the healthy sender before the official release time.

The invention is also characterized as an improvement in a method for communication in a computer network to a plurality of receivers comprising the steps of terminating a multicast session at an official release time associated with the multicast message with every member of the multicast group, including the sender and every intended receiver, by letting a receiver decide at the official release time that a multicast session has been successfully completed when all of the following conditions are met:

(i) neither the receiver nor a local communication manager has received any fault detection report from local or remote fault detectors, or where the receiver or local communication manager has received fault detection reports from the local and/or remote fault detectors, but judged that the faults detected could not have impacted the correctness of the multicast;

(ii) The receiver has received the multicast message and returned an ACK-message; and (iii) The receiver has not received any cancellation notice from the sender.

The invention is still further characterized as an improvement in a method for communication in a computer network to a plurality of receivers comprising the step of terminating a multicast session at an official release time associated with the multicast message with every member of the multicast group, including the sender and every intended receiver, by letting the sender decide at the official release time that a multicast session has been successfully completed when all of the following conditions are met:

(i) Neither the sender nor the local communication manager has received any fault detection report from the local or remote fault detectors, or where the sender or the local communication manager has received fault detection reports from the local and/or fault detectors, but judged that the faults detected could not have impacted the correctness of the multicast about to be concluded; and (ii) The sender has received an ACK-message from every intended receiver.

The invention is an improvement in a method for communication in a computer network to a plurality of receivers comprising the steps of terminating a multicast session in every healthy member of a multicast group, including a sender and every intended receiver, with the conclusion of the multicast session on the failure and the cancellation of the multicast session at or before arrival of an official release time associated with a multicast message by letting a receiver decide at or before the official release time that a multicast session has been cancelled when at least one of the following conditions is met:

(i) The receiver has received a cancellation notice from the sender; or (ii) The receiver has not received the multicast message but somehow learned of the multicast session in process as well as the associated official release time; or (iii) The receiver or a local communication manager has received fault detection reports from local and/or remote fault detectors and judged that the faults detected were in the local node and due to the faults detected, the multicast session must be concluded as a failure; or (iv) The receiver or local communication manager has received fault detection reports from the local and/or remote fault detectors and judged that the faults detected were outside the local node and due to the faults detected, the multicast session must be concluded as a failure.

The invention is also an improvement in a method for communication in a computer network to a plurality of receivers comprising the steps of terminating a multicast session in every healthy member of a multicast group, including a sender and every intended receiver, with the conclusion of the multicast session on the failure and the cancellation of the multicast session at or before arrival of an official release time associated with a multicast message by letting the sender decide at the official release time that a multicast session has been successfully completed when at least one of the following conditions is met:

(i) The sender has made a predetermined number of attempts to send the multicast message to an intended receiver, but the sender has not received an ACK-message from the intended receiver within a predetermined time bound and thus the sender has sent a cancellation notice to every intended receiver; or (ii) The sender or a local communication manager has received fault detection reports from the local and/or remote fault detectors and judged that the faults detected were in the local node and due to the faults detected, the multicast must be concluded as a failure and thus the sender has sent a cancellation notice to every intended receiver; or (iii) The sender or a local communication manager has received fault detection reports from the local and/or remote fault detectors and judged that the faults detected were outside the local node and due to the faults detected, the multicast session must be concluded as a failure and thus the sender has sent a cancellation notice to every intended receiver.

The invention is also the apparatus or combination of means for performing the above steps, which may be implemented in general purpose computers subject to software control according to the teachings of the invention, or which may be implemented in conventional firmware or logic circuitry designed to perform the recited functions.

While the apparatus and method have been or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
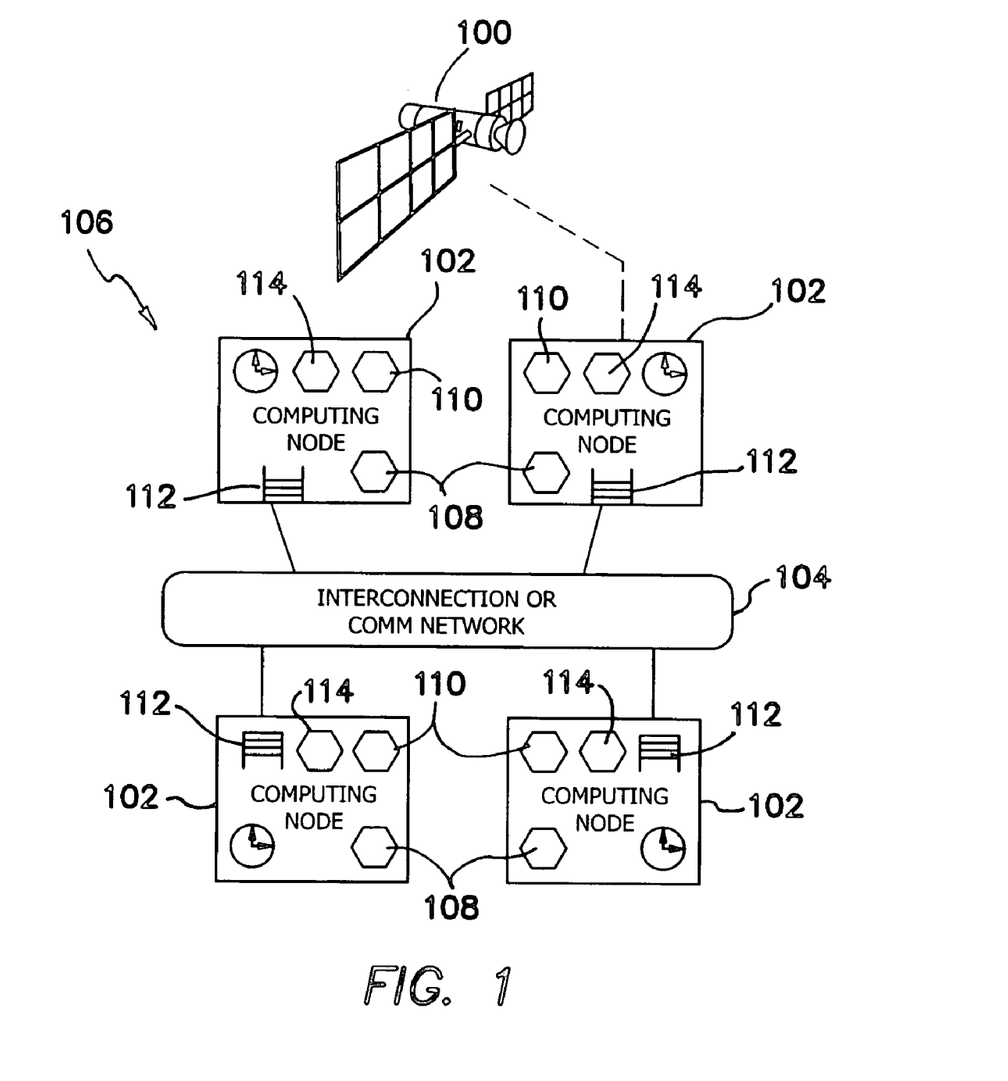
FIG. 1 is a block diagram depicting a generalized computer network in which a plurality of computer nodes using a global time clock multicast through a network.

The invention is directed to communications among a group of computers or computer nodes 102 as shown in FIG. 1 which exchange messages via interconnection networks and/or communication media 106 (e.g., back-plane bus, wired local area network connections such as Ethernet, wireless network connections such as IEEE 802.11, Internet, etc.). The term "computer" and "computer node" will be used interchangeably to denote in very general terms any type of information exchange or storage circuit or apparatus and should not be understood to be limited to digital processors, but to include any type of information or data handling device or devices. The computer nodes 102 must be able to reference a global time base, which allows each computer at any instant to have a similar understanding of what the current time is, regardless of whether the current time is expressed as a calendar time (i.e., year-month-day-hour-minute-second-millisecond-microsecond), or the amount of time elapsed since the occurrence of a reference event. The reference event is an event, which is known to all the computers engaged in cooperative computation. Examples include the powering-on of a particular computer, the starting of the cooperative computation by a group of computers, an announcement of the start of distributed computing by a computer node chosen to function as the master node, or any other event now known or later definable in the art.

There are many known methods for facilitating reference by a group of cooperating computer nodes to a global time base. One way is to equip each computer node 102 with a GPS (Global Positioning System) receiver 100, symbolically depicted in FIG. 1 by a communications satellite. A variation of this is to equip only a subset of the computer nodes 102 in a network 106 of cooperating computers with GPS receivers. Those nodes 102 with GPS receivers inform other nodes 102 without GPS receivers about the current time via message communication. Another variation of this method is to equip some or all computer nodes 102 with receivers which can obtain current time information from a remote standard time sources (e.g., UTC) other than GPS satellites. Another method is to let every node 102 exchange messages with some other nodes 102 and use local clock values in the nodes 102 to derive an understanding of the current time commonly understood by distributed cooperating nodes 102. This method does not require access to standard time sources such as UTC, GPS, etc. A variety of mixtures of the methods mentioned above have been published and/or practiced to enable a group of cooperating computer nodes 102 to be able to reference a global time base. It must therefore be understood, that the means by which a global time base can be established in network 106 is not limited by the disclosed embodiments, but includes all means now known or later devised for performing this function.

One embodiment of the components which multicast messages among themselves are software components 108 housed in various computer nodes 102 as shown in FIG. 1. Some of these components 108 may be housed in the same computer node 102, but may also be distributed among separate nodes 102. When a component 108 sends a message to another component 108, the node 102 in which the sending component 108 is housed is defined as the source or sending node 102 or even simply the "sender" and the node 102 in which a receiving component 108 is housed is called the destination node 102 or even simply the "receiver". However, more often than not, the sender refers to the software component which sends a multicast message to other software components, rather than referring to the computer node in which the software component is housed, and the latter software components to which the multicast message is sent are referred to as receivers. Every computer node 102 also contains a system software component defined as a communication manager 110, which in very general terms handles the communication into and out of the node 102 and possible communications between components 108 within a node 102. When the source node 102 and the destination node 102 are different, the sending software component 108 sends the message along with a sending request to the local communication manager 110, i.e., the communication manager 110 of the source node 102. The source communication manager 110 loads the message onto a communication link 104 and lets the message go through the link 104. The message then arrives at the destination node 102. Within the destination node, the message is first entered into a storage area of queue structure called a node buffer 112. The arrival of the message at the node buffer 112 is recognized by the communication manager 110 of the destination node 102. Later the message is moved by the communication manager 110 from the node buffer 112 to the destination software component 108 and that message move is defined as the "release" of the message to the destination software component 108.

A computer node 102 is defined as being in a "healthy state" when it is capable of supporting all software components 108 housed within it and when its communication manager 110 can support the message communication needs of all those software components 108. A computer node 102 is defined as entering a "disabled state" when a symptom of a permanent malfunction is detected and as a result its communication manager 110 is stopped. A computer node 102 may reenter a healthy state when it has been repaired and restarted in a condition with the capability for supporting all software components 108 housed within it. A software component 108 running on a healthy computer node 102 is in a healthy state when it can receive a message that is addressed to it and has arrived at the local node buffer 112 and when it can respond to the received message properly as specified. A software component running on a healthy computer node 102 enters a disabled state when it cannot receive a message that is addressed to it which has arrived at the local node buffer 112, or when it cannot respond to the received message properly as specified.

Every computer node 102 has at least one system software component 114 called a fault detector which may cooperate with other fault detectors 114 running on other computer nodes 102 and sends to the local communication manager 110 the following reports:

(a) Reports on the temporary and permanent faults of some parts of the network infrastructure 104 which relate in some way to the ability of network 104 to carry a message from one computer node 102 to another computer node 102.

(b) Reports on the temporary and permanent faults of some hardware and/or software components 108 within the local computer node 102.

(c) Reports on the temporary and permanent faults of some hardware and/or software components 108 in another computer node 102. These reports may or may not originate from a fault detector 114 in another computer node 102, which means that there is the possibility of a nonmember of the group to provide diagnostic help, e.g. a remote supervising computer.

A software component 108 engaged in a multicast as a receiver may be implemented to generate an acknowledgment (ACK-) message as it receives a multicast message or the local communication manager 110 may be set to generate an ACK-message and return it to the sender node. Whenever we say that "a receiver returns an ACK-message", we imply both implementation options. In some cases the absence of a negative ACK-message, e.g., a message from an intended receiver indicating the non-arrival of a valid multicast message, or a message from a non-member indicating the failure of the multicast message transmission to an intended receiver, that is recognized within a predetermined time bound is interpreted as the receipt of an ACK-message.

Multicast protocols are characterized according to the invention as applications of established real-time fault tolerance techniques effective in handling failures of low-level components such as processors, paths in communication/interconnection networks, processor-network interfaces, and operating systems components. Consider first a characterization of the application goals of group communication protocols. Then consider the relationship between group communication protocols and fault tolerance and a practical framework for fault-tolerant real-time multicast facilities. Effective programming interfaces for real-time multicast facilities are then discussed 1. Application Goals of Multicasts There are largely two types of conceivable needs for group communications in real-time distributed computing systems (DCS's). First, there are server replicas and tightly coupled heterogeneous servers. Components of a DCS often maintain the client-server relationship among themselves. For the sake of attaining high system reliability and performance, servers are often replicated. These server replicas must then maintain strict consistency among their states. Each message from a client must be received consistently by these server replicas. Also, clients and diverse servers are often tightly coupled in the sense that they interact closely and every party should read the messages in the same order from multiple sources even if not every party reads the identical set of messages.

Second, there are news multicast to casual readers. This communication pattern occurs when the sending processor $10a$'s behavior after multicasting the news does not depend on the receiving processor $10b$'s behavior and it is not necessary for the receiving processor $10bs$ to read the news items in the same order. Therefore, the basic purpose of developing group communication protocols to be used in real-time DCS's is to attain high performance in operating tightly coupled servers and/or achieving casual news multicasts.

However, two additional purposes have been discussed in literature. The first of these is abstract distributed programming. Recently logical multicast channel (LMC) has been proposed as a programming abstraction for distributed software components or to be more specific, for their interactions. LMC is meant to be a complement to the remote method call facility. LMC is an abstract facility for message sharing among groups of distributed software components. For example, real-time multicast and memory-replication channel (RMMC) described in Kim, K. H., "*APIs for Real-Time Distributed Object Programming*", IEEE Computer, June 2000, pp. 72–80, is a case of an LMC which facilitates time-stamp ordered message multicasts as well as distributed shared memory variables. LMC's may often lead to more abstract and compact distributed programming than the remote method call does. Moreover, if a high-performance low-level multicast facility is available, use of LMC's will also lead to higher performance of distributed application software.

The second additional purpose suggested by some researchers is to use reliable multicast and other group communication protocols and mechanisms as basic building-blocks for fault-tolerant distributed systems. Although there is nothing wrong with this concept, its effectiveness must be evaluated after establishing reliable multicast mechanisms. Therefore, it is more urgent to establish practically effective mechanisms for reliable real-time multicast.

2. The Main Challenge in Group Communications

Multicasts in absence of the possibility of component failures are simple programming problems. In systems based on point-to-point networks, a multicast is merely a finite sequence of point-to-point single message communications. In systems based on physical broadcast facilities, a multicast may become a single broadcast with a group ID in the message header field. As an illustration, consider only systems equipped with point-to-point networks since multicast problems in such systems are more complicated than in other systems. The main challenge in establishing multicast and other group communication protocols is to deal with possible fault occurrences. Therefore, it is important to first establish and understand the effective techniques for detecting and recovering faults in real-time DCS's.

Techniques for handling failures of low-level components which occur during single point-to-point message communications are assumed for the sake of discussion as given. Here major cases of low-level components are processors, paths in communication/interconnection networks, processor-network interfaces, and operating system components. Possible component failures during a multicast do not then introduce any new problems. Therefore, the essence of the challenge is to perform single point-to-point message communication in spite of component failures. Therefore, it is worth casting multicast and other group communication protocols as applications of established real-time fault tolerance techniques effective in handling failures of low-level components.

3. Real-Time Fault-Tolerant Point-To-Point Communication of a Message

Consider now a formal definition of the problem of real-time fault-tolerant point-to-point communication of a message. Since the number of components in a typical point-to-point network architecture is large, a clear and yet accurate representation of all possible fault sources is a challenging issue. The most practical approach is to group various potential fault sources into a manageable set of categories.

Figure 2:
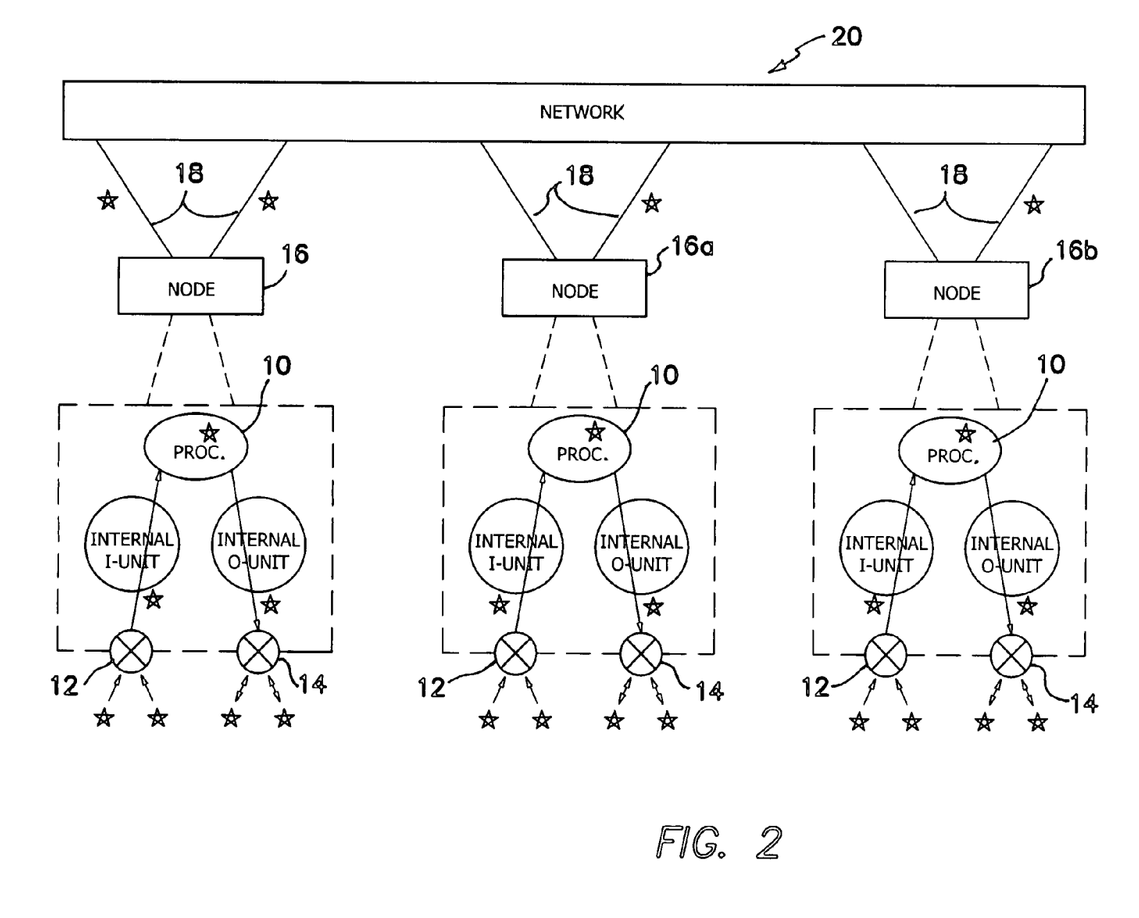
FIG. 2 is a block diagram depicting a generalized computer network in which a plurality of fault sources may exist.

In the model depicted in FIG. 2, possible sources of faults in a node are represented by a processor 10, an incoming communication handling unit (I-unit) 12 and an outgoing communication handling unit (O-unit) 14. Faults in the processor 10 represent faults in the executing software that could cause the node to crash, faults in the processor hardware, faults in memory modules, etc. Faults in the I-unit 12 represent the faults in various components of a node (both hardware and software) that are involved in receiving a message from the network. Faults in the O-unit 14 represent faults in various node components (both hardware and software) that are involved in sending a message to the network. The messages sent or received by a node 16 here include both the messages that are destined for the node 16 itself as well as the messages that are stored in the node 16 temporarily before being routed off to other destinations. Any observed fault of a node 16 could be an instance of a combination of faults in the fault sources mentioned above. The remaining fault source is the point-to-point interconnection network 18. Faults in the interconnection network 18 represent faults in one or more links of the interconnection network.

In the following, we define each of the four fault sources described in the fault source model in FIG. 2 as a fault source component 20. We assume that since the routing scheme is of the store-and-forward type, a permanent failure of any one of the fault source components 20 in a node 16 disables not only the node's processing capabilities but also the node's routing capabilities.

3.1 Detection of Transient Faults

First consider the impacts of temporary failures of fault source components.

3.1.1 Detection by the Network Infrastructure

Network infrastructure refers to the facility involved in carrying a message from the sending processor 10*a* shown in FIG. 2 to the receiving processor 10*b*, i.e., the O-unit 14*a* of the sending processor 10*a* node 16*a*, the point-to-point interconnection network 18, and the I-unit 12*b* of the receiving processor 10*b* node 16*b*. This is a case where the network infrastructure has a self-checking capability, i.e., the ability of the infrastructure to detect its own fault that manifests itself in the form of message loss and message corruption. The sending processor 10*a* processor 10*a* may learn this fault of the network infrastructure, in which case it may or may not make retry at sending the message. This is an application-dependent decision. Therefore, a real-time message communication is completed either with the successful delivery to the receiving processor 10*b* or with delivery failure known to the sending processor 10*a*.

3.1.2 Detection by the Sending Processor

The sending processor 10*a* typically detects the failure of the message communication by noticing the absence of the acknowledgment message from the receiving processor 10*b*. However, the problem here can become quite complicated because the possibility exists that the receiving processor 10*b* received the main message and generated the acknowledgment message (ACK-message) properly but network infrastructure 18 failed to carry the ACK-message. Therefore, upon noticing the absence of the ACK-message, the sending processor 10*a* cannot be certain that the receiving processor 10*b* did not receive the main message. Moreover, the receiving processor 10*b*, which received the main message, may proceed to take some actions while the sending processor 10*a* suspects that the receiving processor 10*b* might not have received the message. The sending processor 10*a* may resend the message to remove this uncertainty and the receiving processor 10*b* can discard the redundant message after noticing that it is retransmission of the message it received earlier. However, the receiving processor 10*b* must send an ACK-message again and it may again get lost inside the network infrastructure although the probability of this second loss may be quite low.

If the low-probability event of the second loss of the ACK-message occurs, then the sending processor 10*a* may resend the message again to remove the uncertainty. Each time the sending processor 10*a* detects the absence of the ACK-message, the sending processor 10*a* faces the question of whether the main message is now obsolete with respect to the application semantics, i.e., whether it is useless to now send that message. If it has become obsolete, then the sending processor 10*a* will take a different course of action. A very difficult question arises, namely what happens if the sending processor 10*a* takes a different course of action since the message it has tried to send has become obsolete while the receiving processor 10*b* actually received the message and is now following a course of action based on the received message? There cannot be any clean and general answer to this question. Another difficult question is: what happens if the message that the sending processor 10*a* has tried to send has become obsolete and the receiving processor 10*b* indeed has not received the message because of the fault in the network infrastructure 18 or within the receiving processor 10*b* itself? This is a dangerous situation which must be avoided.

Therefore, the arrival at the sending processor 10*a* of an ACK-message (corresponding to the initial transmission or some retransmission of the main message) within an acceptable time limit should be a part of the conditions for successful completion of a real-time message communication. Until such time at which an ACK-message arrives at the sending processor 10*a*, the receiving processor 10*b* must not perform any irrevocable actions based on the received message. A successful message communication can now be defined as follows.

Communication of a message is successful if and only if the message reaches the receiving processor 10*b* with its content intact within the guaranteed delivery time bound (DTB) and a corresponding ACK-message returns to the sending processor 10*a* within the acknowledgment time bound (ATB).

DTB is the bound determined at the design time on the length of the time interval from the instant at which the message leaves from the sending processor 10*a* to the instant at which the message reaches the receiving processor 10*b*. ATB is the bound determined at the design time on the length of the time interval from the instant at which the main message leaves from the sending processor 10*a* to the instant at which an ACK-message from the receiving processor 10*b* corresponding to the initial transmission or a retransmission of the main message arrives at the sending processor 10*a* processor. The use of DTB is optional and the invention may be practiced without the necessary inclusion of this feature.

Now if an ACK-message does not return within ATB, the sending processor 10*a* can act as if the message communication failed regardless of whether the receiving processor 10*b* received the message or not. The attempted real-time message communication has been completed with delivery failure known to the sending processor 10*a*, which will attempt to inform the receiving processor 10*b* (so that the latter may revoke some actions taken). Needless to say, communication of critical messages must be designed into applications with the above understanding of DTB and ATB.

3.1.3 Detection by the Receiving Processor:

The receiving processor 10*b* can detect the failure of the message communication only when it knows in advance the transmission schedule of the sending processor 10*a*. For example, if the sending processor 10*a* previously told the receiving processor 10*b* that the former would send an important message at 10am, then the latter can detect the failure if the message does not arrive by DTB seconds after 10am. For another example, if the system is equipped with a TDMA bus network and every processor 10 is designed to send some message even with null content during its slot in each TDMA cycle, then every other processor 10' can detect the failure of message communication initiated by the former processor 10".

In this case, the receiving processor 10*b* should attempt to inform the sending processor 10*a* of the nonarrival of the message. The sending processor 10*a* can learn of the failure not only by this notice from the receiving processor 10*b* but also by a time-out on the return of the ACK-message.

Again, whether the sending processor 10*a* makes a retry at sending the message depends on the application. In any case, the attempted real-time message communication can be completed with delivery failure known to both the sending and the receiving processors 10*a* and 10*b*.

3.2 Detection of Permanent Faults

So far, we have considered the impacts of transient faults of fault source components 20 occurring during the message communication. Let us now consider the impacts of permanent faults. The capabilities for detection of the permanent faults of various fault source components 20 are distributed within the system including the network infrastructure 18. Some of those capabilities may be borne by the sending processor 10a and the receiving processor 10b. Such conventional distributed capabilities for detection of permanent faults are collectively termed the system-wide permanent fault detection (SwPFaD) facility 22. A good example of an approach to implementing the SwPFaD facility is discussed in Kim, K. H., and Subbaraman, C., "*Dynamic Configuration Management in Reliable Distributed Real-Time Information Systems*", IEEE Trans. on Knowledge and Data Eng., Vol. 11, No. 1, January/February 1999, pp. 239–254.

It should be noted that the detection by the SwPFaD facility 22 of permanent faults is separate from the sending processor's 10a time-out on the ACK-message. Even the ordering of the two events varies depending upon the circumstances.

3.2.1 Permanent Faults of Some Components in the Network Infrastructure:

Permanent faults of some components in the network infrastructure are detected by the SwPFaD facility 22 in general. If the sending processor 10a experiences a time-out on the ACK-message before the SwPFaD facility 22 concludes on detection of these permanent faults, the sending processor 10a acts as in the case of handling transient faults. Once these permanent faults are concluded, the only important question here is whether the network infrastructure has enough capacity (e.g., alternate route) left for carrying a message from the sending processor 10a to the receiving processor 10b. If it has, the sending processor 10a may exercise a resend option. If it does not, then the sending processor 10a concludes the message communication attempt with the failure result. Furthermore, the sending processor 10a may follow a drastically different application scenario from that point on or give up the current application.

3.2.2 Permanent Faults of the I-unit, the O-unit, and the Processor of the Receiving Node These faults are detected by the SwPFaD facility in general 22. If the sending processor experiences a time-out on the ACK-message before the SwPFaD facility 22 concludes on detection of these permanent faults, the sending processor 10a acts as in the case of handling transient faults. Once the permanent fault in any of the three components of the receiving node 16b is concluded, then practically the receiving node 16b is dead from the sending processor's 10a point of view. Therefore, the sending processor 10a must conclude the message communication attempt with the failure result.

3.2.3. Permanent Faults of the I-unit, the O-unit, and the Processor of the Sending Node Permanent faults of the I-unit 12, the O-unit 14, and the processor 10a of the sending node are detected by the SwPFaD facility 22 in general. If the sending processor 10a experiences a time-out on the ACK-message before the SwPFaD facility 22 concludes on detection of permanent faults of the I-unit 12a or the O-unit 14a of the sending node 16a, the sending processor 10a acts as in the case of handling transient faults. Once the permanent fault of any of three components of the receiving node 16b is concluded, then practically the receiving node 16b is unusable for any meaningful application. Therefore, not only the message communication attempt from the sending processor 10a is automatically concluded with the failure result but also a system-wide fault tolerance action sequence to compensate for the loss of the sending node must begin. A part of the fault tolerance action sequence will be for the receiving node 16b to remove the remaining effects of the failed message communication attempt of the lost sending processor 10a.

Therefore, an attempt for communication of a message is defined to be completed at one of the following instants:

(1) When the sending processor 10a receives an ACK-message within ATB;

(2) When the sending processor 10a learns, before receiving an ACK-message, of the permanent fault of any of the three components of the receiving node 16b;

(3) When the sending processor 10a learns, before receiving an ACK-message, of the permanent fault of the I-unit 12a or the O-unit 14a of the host (sending) node 16a;

(4) When the sending processor 10a learns that the network infrastructure 18 no longer has the capacity for carrying a message from itself to the receiving processor 10b and then the sending processor 10a experiences a time-out on the ACK-message;

(5) When the SwPFaD facility 22 concludes, before the sending processor 10a receives an ACK-message, on the permanent fault of any of the three components of the sending node 16a.

4. Real-Time Fault-Tolerant Multicast

Let us now extend the definition of the real-time fault-tolerant point-to-point message communication above into one for a real-time fault-tolerant multicast. A multicast involves a group of n receiving processors 10b. A multicast of a message is defined as being successful if and only if the message reaches each receiving processor 10b with its content intact within the guaranteed delivery time bound (DTB) after the message leaves from the sending and a corresponding ACK-message returns to the sending processor within the acknowledgment time bound (ATB) after the message leaves from the sending processor 10a.

If the message is delivered to some members of the receiving processor group 10b but not to other members, then the multicast should be cancelled in the case where receiving processors 10b are tightly coupled servers. If the receiving processors 10b are casual news readers, then such a cancellation may not be required, but we will not consider this situation further. Therefore, it may be safer to make every receiving processor 10b process the received message only after it is certain that all other receiving processors 10b received the same message. In RT DCS's (in which the global time base is available), this can be accomplished the most conveniently by asking every receiving processor 10b to process the message at a certain time called the official release time, e.g., 10am, by which the multicast can definitely be completed. Then it is possible that an ACK-message from a certain receiving processor 10b arrives at the sending processor 10a, but the sending processor 10a later notifies the receiving processor 10b about the cancellation of the multicast. Therefore, one problem with this conservative approach is the large delay in completing a multicast since the delay must include the time needed for the sending processor 10a or some other authority to notify cancellation of the multicast to the receiving processors 10b which have received the message already.

Even if some receiving processors 10b receive multiple multicast messages at around the same time, there is no inconsistency among the receiving processors 10b due to the use of official release times. This is an important advantage of the approach of attaching the official release time specification to each multicast message over other approaches of ordering multiple multicast messages.

If communication of the message to any of the n receiving processors 10b fails, then the multicast fails. Therefore, for communication of the message to each receiving processor 10b, a number of retries may be utilized up to a predetermined or user selected number.

The following definition, which implies an approach to terminating a multicast session with the conclusion on the success or failure, follows naturally from the above considerations. An attempt for multicast of a message is said to be completed at one of the following instants:

(1) When the communication of the message to the last receiving processor 10b is successfully completed, i.e., the sending processor 10a receives an ACK-message from the last receiving processor 10b within ATB;

(2) When the communication of the message to any of the receiving processors 10b is completed with the failure result as defined above in connection with the definition of what constitutes a completed attempt.

Once a multicast attempt is determined to be a failure, then the application can perform one of the following three sequences of actions:

(a) The entire application is aborted.

(b) A segment of the application that encompasses the failed multicast action is aborted and a recovery action sequence, such as a state rollback followed by an execution of a less ambitious application-segment, is invoked.

(c) A smaller-scale multicast is attempted and if successful, a corresponding less ambitious application scenario is followed.

An interesting and important special case of (c) above is where the number of receiving processors 10b in the new smaller-scale multicast is the same as or less than the number of successful receiving processors 10b in the larger multicast that just failed. In this case, the notice from the sending node 16a about the cancellation of the failed multicast is sent along with the notice about the decision to move forward with a less ambitious predefined application scenario. Therefore, each receiving processor 10b getting this expanded notice will not abort the message received earlier and instead move forward to follow a newly selected application scenario. For example, the original multicast may have involved 10 receiving processors 10b which are server replicas. When communication of the message to five server replicas are successful and communication to five others are failures, the sending processor 10a or the application coordinator may decide to proceed with five server replicas and give up on the other five. The five surviving server replicas and the system management facilities must be aware of this decision so that from this point on they will be concerned with the consistency among themselves only.

Therefore, an invocation of a fault-tolerant real-time multicast action can be specified as:

FR multicast (receiving-group, official-release-time 10am, on-failure action-sequence-b( )).

From each of the four definitions above one can calculate a tight multicast delay bound, i.e., a bound on the amount of time taken for completion of a multicast (with the success or failure result). The designer of the sending processor 10a must of course choose the official release time for a multicast message with good understanding of the multicast delay bound.

5. Summarization of Invention

The invention can thus be summarized as follows.

(1) The SwPFaD (system-wide permanent fault detection) facility 22 plays an important role in determining the efficiency of fault-tolerant real-time multicast.

(2) The performance aspect of the fault-tolerant real-time multicast protocol can be optimized in a reasonable sense.

(3) Efficient multicasts over the network infrastructure consisting of a mixture of broadcast subnets and point-to-point subnets are another subject can be used to advantage. A good efficiency measure is the multicast delay bound.

(4) Programming interfaces for the real-time multicast facilities can be used to advantage. The programming interface, especially, the programming of an action sequence to be followed on completion of a multicast with the failure result, is an useful feature.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in a method for communication in a computer network to a plurality of receivers comprising:
   terminating a multicast session at an official release time associated with a multicast message with every member of a multicast group, including a sender and every intended receiver, by letting a receiver decide at the official release time that a multicast session has been successfully completed when all of the following conditions are met:
   (i) neither the receiver nor a local communication manager has received any fault detection report from local or remote fault detectors, or where the receiver or local communication manager has received fault detection reports from the local and/or remote fault detectors, but judged that the faults detected could not have impacted the correctness of the multicast; and
   (ii) the receiver has received the multicast message and returned an ACK-message; and
   (iii) the receiver has not received any cancellation notice from the sender.

2. An improvement in a method for communication in a computer network to a plurality of receivers comprising:
   terminating a multicast session at an official release time associated with a multicast message with every member of a multicast group, including a sender and every intended receiver, by letting the sender decide at the official release time that a multicast session has been successfully completed when all of the following conditions are met:
   (i) Neither the sender nor the local communication manager has received any fault detection report from the local or remote fault detectors, or where the sender or the local communication manager has received fault detection reports from the local and/or fault detectors, but judged that the faults detected could not have impacted the correctness of the multicast about to be concluded; and
   (ii) The sender has received an ACK-message from every intended receiver.

3. The improvement of claim 1 further comprising:
   terminating a multicast session at an official release time associated with a multicast message with every member of a multicast group, including a sender and every intended receiver, by letting the sender decide at the official release time that a multicast session has been successfully completed when all of the following conditions are met:
   (i) Neither the sender nor the local communication manager has received any fault detection report from the local or remote fault detectors, or where the sender or the local communication manager has received fault detection reports from the local and/or fault detectors, but judged that the faults detected could not have impacted the correctness of the multicast about to be concluded; and
   (ii) The sender has received an ACK-message from every intended receiver.

4. An improvement in a method for communication in a computer network to a plurality of receivers comprising:
   terminating a multicast session in every healthy member of a multicast group, including a sender and every intended receiver with the conclusion of the multicast session on the failure and the cancellation of the multicast session at or before arrival of an official release time associated with a multicast message by letting the sender decide at or before the official release time that a multicast session has been cancelled when at least one of the following conditions is met:
   (i) The sender or a local communication manager has received fault detection reports from the local and/or remote fault detectors and judged that the faults detected were in the local node and due to the faults detected, the multicast must be concluded as a failure and thus the sender has sent a cancellation notice to every intended receiver; or
   (ii) The sender or a local communication manager has received fault detection reports from the local and/or remote fault detectors and judged that the faults detected were outside the local node and due to the faults detected, the multicast session must be concluded as a failure and thus the sender has sent a cancellation notice to every intended receiver.

5. An improvement in a method for communication in a computer network to a plurality of receivers comprising:
   terminating a multicast session in every healthy member of a multicast group, including a sender and every intended receiver with the conclusion of the multicast session on the failure and the cancellation of the multicast session at or before arrival of an official release time associated with a multicast message by letting a receiver decide at or before the official release time that a multicast session has been cancelled when at least one of the following conditions is met:
   (i) The receiver has received a cancellation notice from another receiver; or
   (ii) the receiver becomes disabled after sending an ACK-message but before the official release time; or
   (iii) The receiver or a local communication manager has received fault detection reports from local and/or remote fault detectors and judged that the faults detected were in the local node and due to the faults detected, the multicast session must be concluded as a failure; or
   (iv) The receiver or local communication manager has received fault detection reports from the local and/or remote fault detectors and judged that the faults detected were outside the local node and due to the faults detected, the multicast session must be concluded as a failure, and
   terminating a multicast session in every healthy member of a multicast group, including a sender and every intended receiver with the conclusion of the multicast session on the failure and the cancellation of the multicast session at or before arrival of an official release time associated with a multicast message by letting the sender decide at or before the official release time that a multicast session has been cancelled when at least one of the following conditions is met:
   (i) The sender or a local communication manager has received fault detection reports from the local and/or remote fault detectors and judged that the faults detected were in the local node and due to the faults detected, the multicast must be concluded as a failure and thus the sender has sent a cancellation notice to every intended receiver; or
   (ii) The sender or a local communication manager has received fault detection reports from the local and/or remote fault detectors and judged that the faults detected were outside the local node and due to the faults detected, the multicast session must be concluded as a failure and thus the sender has sent a cancellation notice to every intended receiver.

6. An improvement in a method for communication in a computer network to a plurality of receivers in a multicast session comprising the steps of:
- transmitting a multicast message to said plurality of receivers from a sender through said computer network with information on an official release time included in the multicast message, wherein the official release time is chosen such that when both the sender and plurality of the receivers remain fault free during the multicast session, such that the probability of the multicast being completed before the official release time is at or above a predetermined level; and
- terminating a multicast session at an official release time associated with a multicast message with every member of a multicast group, including a sender and every intended receiver, by letting a receiver decide at the official release time that a multicast session has been successfully completed when all of the following conditions are met:
  - (i) neither the receiver nor a local communication manager has received any fault detection report from local or remote fault detectors; and
  - (ii) The receiver has received the multicast message and returned an ACK-message; and
  - (iii) The receiver has not received any cancellation notice from the sender.

7. An improvement in a method for communication in a computer network to a plurality of receivers in a multicast session comprising the steps of:
- transmitting a multicast message to said plurality of receivers from a sender through said computer network with information on an official release time included in the multicast message, wherein the official release time is chosen such that when both the sender and plurality of the receivers remain fault free during the multicast session, such that the probability of the multicast being completed before the official release time is at or above a predetermined level; and
- terminating a multicast session at an official release time associated with a multicast message with every member of a multicast group, including a sender and every intended receiver, by letting the sender decide at the official release time that a multicast session has been successfully completed when all of the following conditions are met:
  - (i) Neither the sender nor a local communication manager has received any fault detection report from the local or remote fault detectors; and
  - (ii) The sender has received an ACK-message from every intended receiver.

8. An improvement in a method for communication in a computer network to a plurality of receivers in a multicast session comprising:
- transmitting a multicast message to said plurality of receivers from a sender through said computer network;
- processing the transmitted multicast message in every receiver at or after a certain time defined as the official release time, which is chosen such that when both the sender and plurality of receivers remain healthy during the multicast session, the probability of the multicast being completed before the official release time is at or above a user selected level; and
- terminating a multicast session at an official release time associated with a multicast message with every member of a multicast group, including a sender and every intended receiver, by letting a receiver decide at the official release time that a multicast session has been successfully completed when all of the following conditions are met:
  - (i) neither the receiver nor a local communication manager has received any fault detection report from local or remote fault detectors; and
  - (ii) The receiver has received the multicast message and returned an ACK-message; and
  - (iii) The receiver has not received any cancellation notice from the sender.

9. An improvement in a method for communication in a computer network to a plurality of receivers in a multicast session comprising:
- transmitting a multicast message to said plurality of receivers from a sender through said computer network;
- processing the transmitted multicast message in every receiver at or after a certain time defined as the official release time, which is chosen such that when both the sender and plurality of receivers remain healthy during the multicast session, the probability of the multicast being completed before the official release time is at or above a user selected level; and
- terminating a multicast session at an official release time associated with a multicast message with every member of a multicast group, including a sender and every intended receiver, by letting the sender decide at the official release time that a multicast session has been successfully completed when all of the following conditions are met:
  - (i) Neither the sender nor the local communication manager has received any fault detection report from the local or remote fault detectors; and
  - (ii) The sender has received an ACK-message from every intended receiver.

10. An improvement in a computer network including a plurality of receivers in a multicast session comprising:
- means for transmitting a multicast message from a sender to said plurality of receivers through said computer network;
- means for processing the received multicast message in said plurality of receivers only after a time defined as the official release time, which is chosen and sent to every receiver by the sender such that the multicast is cancelled, when the message cannot be delivered to a receiver after the sender makes a pre-determined number of attempts or when the sender becomes disabled before it can confirm the success of the multicast;
- means for generating a cancellation notice by any member;
- means for performing a cancellation step by all intended healthy receivers and the healthy sender before the official release time;
- where the means for processing the transmitted multicast message in every receiver has completed processing the multicast when at least one of the following conditions is met:
  - (i) When the communication of the multicast message to the last one of said plurality of receivers is successfully completed; or
  - (ii) When the communication of the multicast message to any of the receivers fails; and
- means for terminating a multicast session at an official release time associated with the multicast message with every member of the multicast group, including the sender and every intended receiver, by letting a receiver decide at the official release time that a multicast session has been successfully completed when all of the following conditions are met:
(i) neither the receiver nor a local communication manager has received any fault detection report from local or remote fault detectors, or where the receiver or local communication manager has received fault detection reports from the local and/or remote fault detectors, but judged that the faults detected could not have impacted the correctness of the multicast; and
(ii) The receiver has received the multicast message and returned an ACK-message; and
(iii) The receiver has not received any cancellation notice from the sender.

11. An improvement in a computer network including a plurality of receivers in a multicast session comprising:
means for transmitting a multicast message from a sender to said plurality of receivers through said computer network;
means for processing the received multicast message in said plurality of receivers only after a time defined as the official release time, which is chosen and sent to every receiver by the sender such that the multicast is cancelled, when the message cannot be delivered to a receiver after the sender makes a pre-determined number of attempts or when the sender becomes disabled before it can confirm the success of the multicast;
means for generating a cancellation notice by any member;
means for performing a cancellation step by all intended healthy receivers and the healthy sender before the official release time;
where the means for processing the transmitted multicast message in every receiver has completed processing the multicast when at least one of the following conditions is met:
(i) When the communication of the multicast message to the last one of said plurality of receivers is successfully completed; or
(ii) When the communication of the multicast message to any of the receivers fails; and
means for terminating a multicast session at an official release time associated with the multicast message with every member of the multicast group, including the sender and every intended receiver, by letting the sender decide at the official release time that a multicast session has been successfully completed when all of the following conditions are met:
(i) Neither the sender nor the local communication manager has received any fault detection report from the local or remote fault detectors, or where the sender or the local communication manager has received fault detection reports from the local and/or fault detectors, but judged that the faults detected could not have impacted the correctness of the multicast about to be concluded; and
(ii) The sender has received an ACK-message from every intended receiver.

12. An improvement in a computer network including a plurality of receivers in a multicast session comprising:
means for transmitting a multicast message from a sender to said plurality of receivers through said computer network;
means for processing the received multicast message in said plurality of receivers only after a time defined as the official release time, which is chosen and sent to every receiver by the sender such that the multicast is cancelled when the sender becomes disabled before it can confirm the success of the multicast;
means for generating a cancellation notice by any healthy member; and
means for performing a cancellation step by all intended healthy receivers before the official release time,
where the means for processing the transmitted multicast message in every receiver has completed processing the multicast when at least one of the following conditions is met:
(i) When the communication of the multicast message to the last one of said plurality of receivers is successfully completed; or
(ii) When the communication of the multicast message to any of the receivers fails
means for terminating a multicast session in every healthy member of a multicast group, including a sender and every intended receiver, with the conclusion of the multicast session on the failure and the cancellation of the multicast session at or before arrival of an official release time associated with a multicast message by letting a receiver decide at or before the official release time that a multicast session has been cancelled when at least one of the following conditions is met:
(i) The receiver has received a cancellation notice from receiver; or
(ii) The receiver or a local communication manager has received fault detection reports from local and/or remote fault detectors and judged that the faults detected were in the local node and due to the faults detected, the multicast session must be concluded as a failure; or
(iii) The receiver or local communication manager has received fault detection reports from the local and/or remote fault detectors and judged that the faults detected were outside the local node and due to the faults detected, the multicast session must be concluded as a failure.

13. An improvement in a method for communication in a computer network to a plurality of receivers comprising:
transmitting a multicast message from a sender to said plurality of receivers through said computer network;
processing the received multicast message in said plurality of receivers only after a time defined as the official release time, which is chosen and sent to every receiver by the sender such that the multicast is cancelled when a receiver becomes disabled after sending an ACK-message but before the official release time;
generating a cancellation notice by the sender which has learned the failure of the receiver from local or remote fault detectors; and
performing a cancellation step by all intended healthy receivers and the healthy sender before the official release time.

14. An improvement in a computer network including a plurality of receivers in a multicast session comprising:
means for transmitting a multicast message from a sender to said plurality of receivers through said computer network;
means for processing the received multicast message in said plurality of receivers only after a time defined as the official release time, which is chosen and sent to every receiver by the sender such that the multicast is cancelled when the receiver becomes disabled after sending an ACK-message but before the official release time;

means for generating a cancellation notice by any member;

means for performing a cancellation step by all intended healthy receivers and the healthy sender before the official release time; and means for terminating a multicast session at an official release time associated with a multicast message with every member of a multicast group, including a sender and every intended receiver, by letting a receiver decide at the official release time that a multicast session has been successfully completed when all of the following conditions are met:
  (i) neither the receiver nor a local communication manager has received any fault detection report from local or remote fault detectors, or where the receiver or local communication manager has received fault detection reports from the local and/or remote fault detectors, but judged that the faults detected could not have impacted the correctness of the multicast; and
  (ii) the receiver has received the multicast message and returned an ACK-message; and
  (iii) the receiver has not received any cancellation notice from the sender.

15. An improvement in a computer network including a plurality of receivers in a multicast session comprising:

means for transmitting a multicast message from a sender to said plurality of receivers through said computer network;

means for processing the received multicast message in said plurality of receivers only after a time defined as the official release time, which is chosen and sent to every receiver by the sender such that the multicast is cancelled when the receiver becomes disabled after sending an ACK-message but before the official release time;

means for generating a cancellation notice by any member;

means for performing a cancellation step by all intended healthy receivers and the healthy sender before the official release time; and means for terminating a multicast session at an official release time associated with the multicast message with every member of the multicast group, including the sender and every intended receiver, by letting the sender decide at the official release time that a multicast session has been successfully completed when all of the following conditions are met:
  (i) neither the sender nor the local communication manager has received any fault detection report from the local or remote fault detectors, or where the sender or the local communication manager has received fault detection reports from the local and/or fault detectors, but judged that the faults detected could not have impacted the correctness of the multicast about to be concluded; and
  (ii) the sender has received an ACK-message from every intended receiver.

16. An improvement in a computer network including a plurality of receivers in a multicast session comprising:

means for transmitting a multicast message from a sender to said plurality of receivers through said computer network;

means for processing the received multicast message in said plurality of receivers only after a time defined as the official release time, which is chosen and sent to every receiver by the sender such that the multicast is cancelled, when the sender becomes disabled before it can confirm the success of the multicast;

means for generating a cancellation notice by any healthy member;

means for performing a cancellation step by all intended healthy receivers and the healthy sender before the official release time; and means for terminating a multicast session at an official release time associated with a multicast message with every member of a multicast group, including a sender and every intended receiver, by letting a receiver decide at the official release time that a multicast session has been successfully completed when all of the following conditions are met:
  (i) neither the receiver nor a local communication manager has received any fault detection report from local or remote fault detectors, or where the receiver or local communication manager has received fault detection reports from the local and/or remote fault detectors, but judged that the faults detected could not have impacted the correctness of the multicast; and
  (ii) the receiver has received the multicast message and returned an ACK-message; and
  (iii) the receiver has not received any cancellation notice from the sender.

17. An improvement in a computer network including a plurality of receivers in a multicast session comprising:

means for transmitting a multicast message from a sender to said plurality of receivers through said computer network;

means for processing the received multicast message in said plurality of receivers only after a time defined as the official release time, which is chosen and sent to every receiver by the sender such that the multicast is cancelled, when the sender becomes disabled before it can confirm the success of the multicast;

means for generating a cancellation notice by any healthy member;

means for performing a cancellation step by all intended healthy receivers and the healthy sender before the official release time; and means for terminating a multicast session at an official release time associated with the multicast message with every member of the multicast group, including the sender and every intended receiver, by letting the sender decide at the official release time that a multicast session has been successfully completed when all of the following conditions are met:
  (i) neither the sender nor the local communication manager has received any fault detection report from the local or remote fault detectors, or where the sender or the local communication manager has received fault detection reports from the local and/or fault detectors, but judged that the faults detected could not have impacted the correctness of the multicast about to be concluded; and
  (ii) the sender has received an ACK-message from every intended receiver.

* * * * *